(12) United States Patent
Paull

(10) Patent No.: US 7,489,530 B2
(45) Date of Patent: Feb. 10, 2009

(54) HIGH VOLTAGE FULL BRIDGE CIRCUIT AND METHOD FOR OPERATING THE SAME

(75) Inventor: Ian Paull, Henrietta, NY (US)

(73) Assignee: Ameritherm, Inc., Scottsville, NY (US)

( * ) Notice: Subject to any disclaimer, the term of this patent is extended or adjusted under 35 U.S.C. 154(b) by 0 days.

(21) Appl. No.: 11/453,261

(22) Filed: Jun. 15, 2006

(65) Prior Publication Data

US 2007/0002598 A1   Jan. 4, 2007

Related U.S. Application Data

(60) Provisional application No. 60/690,513, filed on Jun. 15, 2005.

(51) Int. Cl.
    *H02M 7/122* (2006.01)
(52) U.S. Cl. .................... 363/56.01; 363/131
(58) Field of Classification Search .......... 363/16, 363/55, 56.01, 131, 135
    See application file for complete search history.

(56) References Cited

U.S. PATENT DOCUMENTS

| | | | |
|---|---|---|---|
| 5,546,295 A * | 8/1996 | Prete et al. ............ 363/17 |
| 5,946,178 A * | 8/1999 | Bijlenga ............ 361/91.5 |
| 5,953,222 A * | 9/1999 | Mizutani ............ 363/56.05 |
| 6,058,031 A * | 5/2000 | Lyons et al. ............ 363/67 |
| 6,353,547 B1 | 3/2002 | Jang et al. |
| 6,838,925 B1 * | 1/2005 | Nielsen ............ 327/391 |
| 6,969,967 B2 | 11/2005 | Su |
| 7,126,409 B2 * | 10/2006 | Nielsen ............ 327/391 |

OTHER PUBLICATIONS

Barbi, I., et al., "DC-DC Converter: Four Switches $V_{pk}=V_{in}/2$, Capacitive Turn-Off Snubbing, ZV Turn-On", IEEE Transactions on Power Electronics, vol. 19, No. 4, Jul. 2004, pp. 918-927.
Ghodke, D.V., et al., "Zvzcs, Dual, Two-Transistor Forward DC-DC Converter with Peak Voltage of Vin/2, High Input and High Power Application", IEEE, Laser System Engineering Division, Centre for Advanced Technology, Indore, India, 2002, pp. 1853-1858.
Abarca, F.V.C., "Novel DC/DC Converters for High-Power Distributed Power Systems", Dissertation submitted to Virginia Polytechnic Institute and State University, 2003, 189 pages.
International Search Report and Written Opinion issued in PCT/US2006/23340 on Sep. 26, 2007, 8 pp.

* cited by examiner

*Primary Examiner*—Adolf Berhane
(74) *Attorney, Agent, or Firm*—Rothwell, Figg, Ernst & Manbeck

(57) ABSTRACT

Switches (such as FET's and other devices) are often used in circuits to generate an AC signal from a DC supply input. There are times when the supplied DC voltage is greater than desired for the ratings of the switches that can or must be used. There are also times when there may be voltage surges or other transient high voltage conditions for which it is desired to have greater margin between the voltage applied and the switch ratings. The circuit described applies across any of the switches a maximum of one half of the supplied DC voltage. The circuit may also be operated in a linear mode for use with analog signals.

15 Claims, 3 Drawing Sheets

HIGH VOLTAGE FULL BRIDGE CIRCUIT AND METHOD FOR OPERATING THE SAME

This application claims the benefit of U.S. provisional Patent Application No. 60/690,513, filed on Jun. 15, 2005. The content of the provisional application is incorporated herein.

BACKGROUND OF THE INVENTION

1. Field of the Invention

The invention relates to the generation of AC voltage from either an AC or DC source. Such AC voltages may be used in induction and dielectric heating, ultrasonic cleaning and welding, audio, and battery powered AC mains replacement ("AC inverter"), or other uses. The AC output may also feed a load such as an AC to DC converter so that the final delivered output is DC.

2. Discussion of the Background

Previous output circuits have performed the function of generating an AC voltage. One implementation of such an output circuit, which uses two switching devices, is shown in FIG. 1. In this circuit 100, switching devices Q1 and Q2 are alternately turned on, neither being on at the same time. DC is blocked by C1 and AC is coupled to load RL, which could be a transformer, resonant circuit, piezo element or other device or circuit which requires large AC drive levels. Note that when either device Q1 or Q2 is turned on, the entire V1 voltage is applied to the device which is off.

Another popular implementation of an output circuit is shown in FIG. 2. Here, switching devices Q1 and Q4 are turned on at the same time, alternating with Q2 and Q3. Blocking capacitor C1 may or may not be used in a given implementation. Again, when a switching device is off, it can be seen that the full voltage V1 may appear across it. That is, for example, when Q1 is on and Q2 is off, Q2 will have essentially all of V1 across it, and must have a voltage rating so as to not fail in this condition.

Switching devices typically may be FET's, IGBT's, or other devices. Whatever technology is chosen for implementation, the devices used may have a maximum voltage specification. When the DC supply available is of high voltage, it may be difficult, expensive or impossible to select or obtain devices with an appropriate voltage specification to operate directly from this source and meet other system requirements. Sometimes, additional circuitry is required to reduce the voltage the switching devices will be exposed to, adding to cost and weight and reducing reliability.

There are also circumstances within integrated circuits where higher voltage devices may not be feasible. This could relate to linear circuits such as operational amplifiers and to switching circuits, such as drivers, or other circuitry.

Additionally, transient voltages or surges may be expected on some sources of applied DC, and if these voltages are directly applied across the switching devices then these devices would need a higher voltage rating for reliable operation.

SUMMARY OF THE INVENTION

The present invention aims to overcome at least some of the disadvantages of the prior art.

In one aspect the invention provides an output circuit having two complementary electrical switching circuits that are connected so that an applied DC voltage is split equally between the two. None of the switching devices of the circuit are exposed to more than one half of the applied DC voltage. The output of the system is taken between the outputs of the two switching circuits. This output may be blocked from the flow of DC current with a capacitor. Relatively low current resistors control the voltage split initially, and are needed primarily to overcome leakage and other minor asymmetries. The voltage split is inherently maintained in circuit operation regardless of duty cycle, allowing non-square (duty cycle other than 50%) and modulated waveforms. A minimum of four switching devices accomplishes this task. Additional switching devices may be added in parallel with those described herein to increase current handling or power dissipation. Additionally, a linear device may be substituted for each switching device, in which case analog signals may be amplified.

In another aspect, the invention provides a method for operating an output circuit that comprises a first, second, third and fourth switch, wherein the switches are connected in series such that the second switch is connected between the first switch and the third switch and the third switch is connected between the second switch and the fourth switch. The method, in some embodiments, includes operating the switches so that the output circuit provides an AC voltage to a load by first enabling the first and fourth switches at the same time, and then enabling the second and third switches at the same time. This cycle may then repeat. There may be a brief interval at the switching transitions to insure that devices that had been on have time to turn off. In some embodiments, the method may also include regulating the output of the circuit through, for example, cycle dropping or pulse width modulation, so as to maintain a controlled average value of lesser output.

In another aspect, the invention provides a method of pre-biasing a blocking capacitor with ½ the input voltage (V1) when all switches have been off for an indefinite period. For this purpose a first resistor is connected across the first switch and a second resistor is connected across the third switch. This prevents larger current surges through C1 than would otherwise occur.

The above and other features and advantages of the present invention, as well as the structure and operation of preferred embodiments of the present invention, are described in detail below with reference to the accompanying drawings.

BRIEF DESCRIPTION OF THE DRAWINGS

The accompanying drawings, which are incorporated herein and form part of the specification, help illustrate various embodiments of the present invention and, together with the description, further serve to explain the principles of the invention and to enable a person skilled in the pertinent art to make and use embodiments of the invention.

DETAILED DESCRIPTION OF PREFERRED EMBODIMENTS

Figure 1:
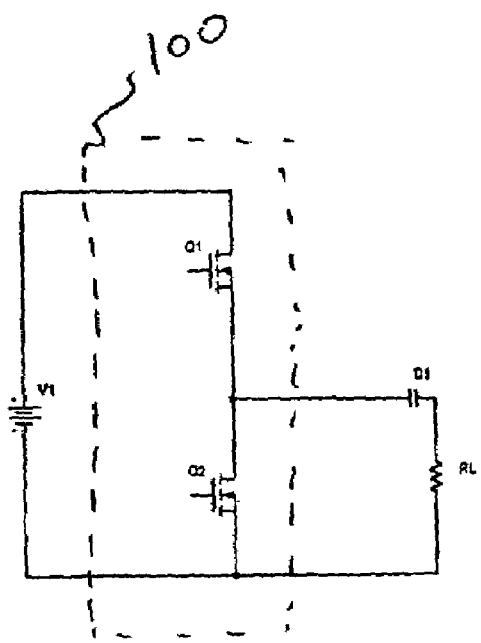
FIG. 1 shows a prior art circuit.
Figure 2:
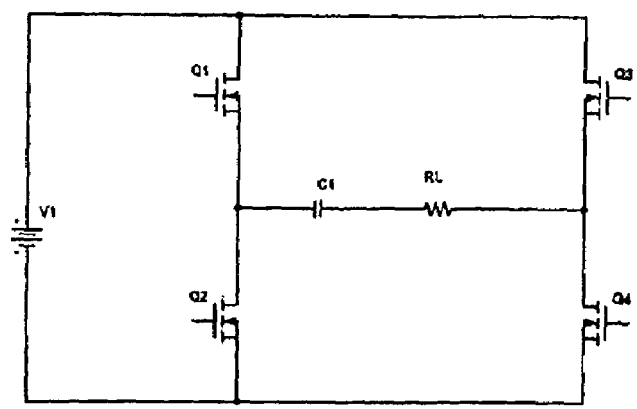
FIG. 2 shows a second prior art circuit.
Figure 3:
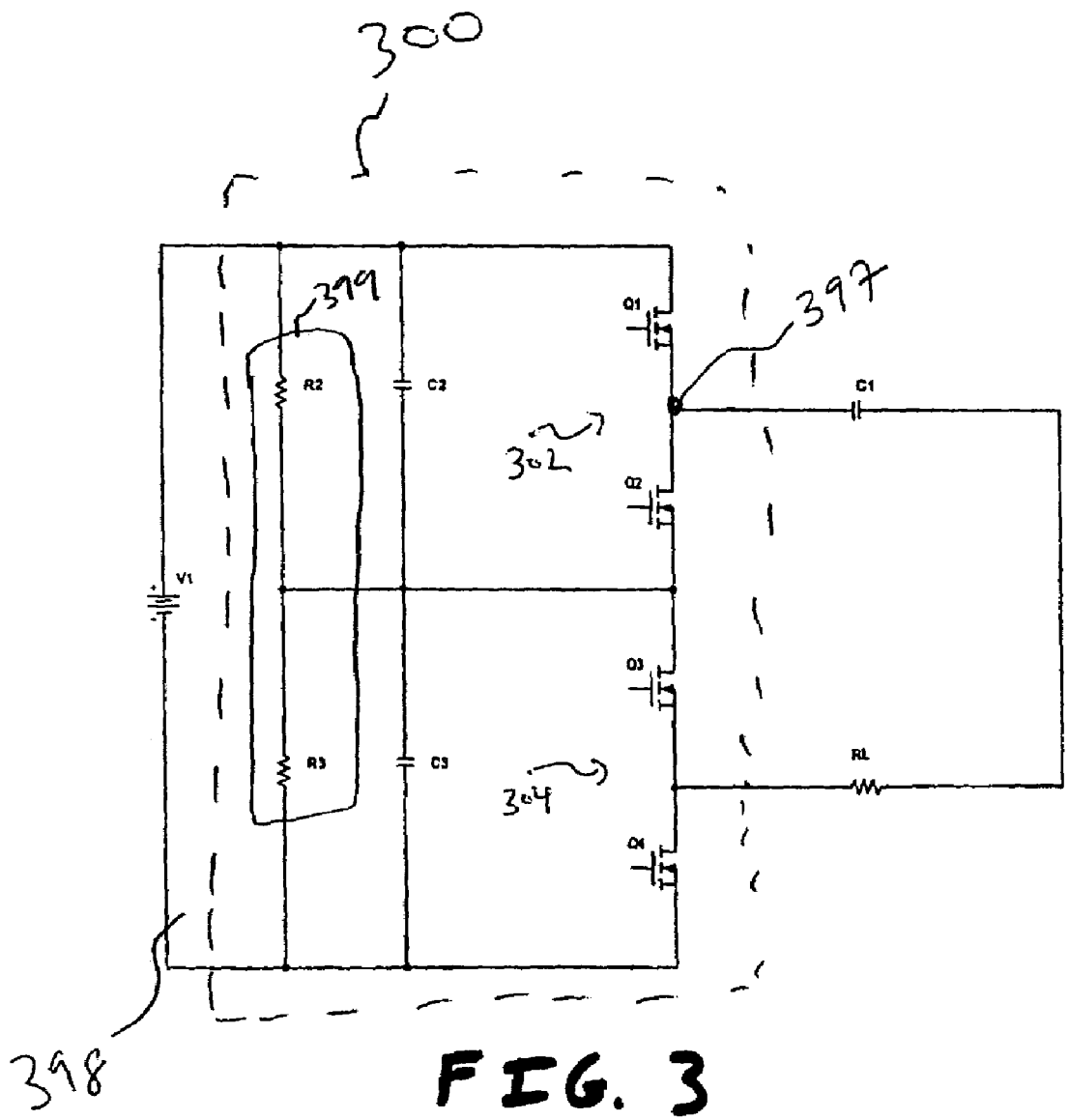
FIG. 3 shows a circuit according to an embodiment of the invention.

FIG. 3 illustrates an output circuit 300 according to some embodiments of the invention (FET's are used for illustration, however IGBT's or other devices may also be used). Circuitry controlling switching devices Q1-Q4 has been omitted for clarity as has rectifier diodes typically built into Q1-Q4, which may also be supplemented with external diodes.

Input voltage V1 supplies power to the circuit 300, and may be a battery or may be derived from an AC or another DC source. As shown in FIG. 3, V1 is connected in parallel with switches Q1-Q4 such that V1 is electrically connected between the first switch and the fourth switch. This input voltage is split into two voltages (which may be equal) by the resistive divider 399, which may be composed of a resistor R2 connected in series with a resistor R3 (as shown, resistive divider and V1 form an electrical loop 398). One half of this split voltage is applied to a filter capacitor C2, and then to the half bridge power stage 302 consisting of switches Q1 and Q2. Similarly, the other half of the split voltage is applied to a filter capacitor C3 and to the half bridge power stage 304 consisting of switches Q3 and Q4. Typically, R2=R3 and C2=C3.

The output AC voltage is taken between the outputs of the two half bridge stages. One point of connection for the output is between Q1 and Q2, while the other point of connection is between Q3 and Q4. Blocking capacitor C1, if used, may have one terminal connected to output node 397 and the other connected to load (RL) and ensures that there is no DC path through load resistor RL which could cause the applied voltage split to significantly deviate from its nominal value if the switching devices were unmatched, improperly controlled, or for any other reason.

Load resistor RL is representative of the output device or circuitry to follow, and could also consist, for example, of a transformer, piezoelectric transducer or resonant circuit. If a resonant circuit is chosen for the load, it may use the blocking capacitor C1 as a part of the resonant circuit. The repetition rate may either be the same as the frequency of resonance, or offset from it.

In operation, control circuitry, which is not shown, is used to turn on Q1 and Q4 at the same time, while Q2 and Q3 are off for one half of a complete cycle. During this time, current is delivered from V1 and C2 and C3 to the output, charging C1 through load resistance RL. During the other half of the cycle, Q2 and Q3 are turned on and Q1 and Q4 are turned off. At this time, C1 is discharged through load resistor RL. Control circuitry may impose a dead time during which all switching devices are off briefly.

During the time when Q2 is on and Q1 is off, Q1 will have across it only the voltage applied to that half bridge, or ½ V1. Similarly, When Q1 is on and Q2 is off, Q2 will only have ½ V1 across it. This relationship also exists between Q3 and Q4.

Switching devices may be put in parallel with those shown, for the purpose of allowing larger currents to be controlled, or for improved power dissipation limits. Similarly, rectifier diodes may be put in parallel with the switching devices to handle currents larger than the ratings of those diodes built into the switches.

Linear devices may be substituted for each switching device, maintaining the improved device operating voltage margin and allowing analog signals to be amplified.

As discussed above, an AC voltage is created by: (1) placing switching devices Q1 and Q4 in a conducting state while devices Q2 and Q3 are in a non-conducting state, which configuration causes C1 to charge through load RL and then (2) placing devices Q1 and Q4 to a non-conducting state while devices Q2 and Q3 are enabled to conduct, which configuration will cause C1 to discharge through load RL. In this fashion, RL has an alternating current forced through it, and may represent any load which can benefit from AC power.

Switching Q1 through Q4 in the above manner does not vary the voltage split defined by resistors R2 and R3, and so these resistors may be large in value and waste little energy, and the switching devices are not exposed to the full potential of V1. Thus, the switching devices may be less expensive than otherwise would be the case, or a higher voltage for V1 may be used than would otherwise be practical.

When the circuit is used to supply power to a load, it is often the case that the amount of power delivered must be regulated. One way of regulating the output is to briefly stop supplying an AC voltage to the load when too much output has been measured, and then resume output shortly thereafter so as to maintain the desired average value. During such a reduction, all switches could remain open.

Figure 4:
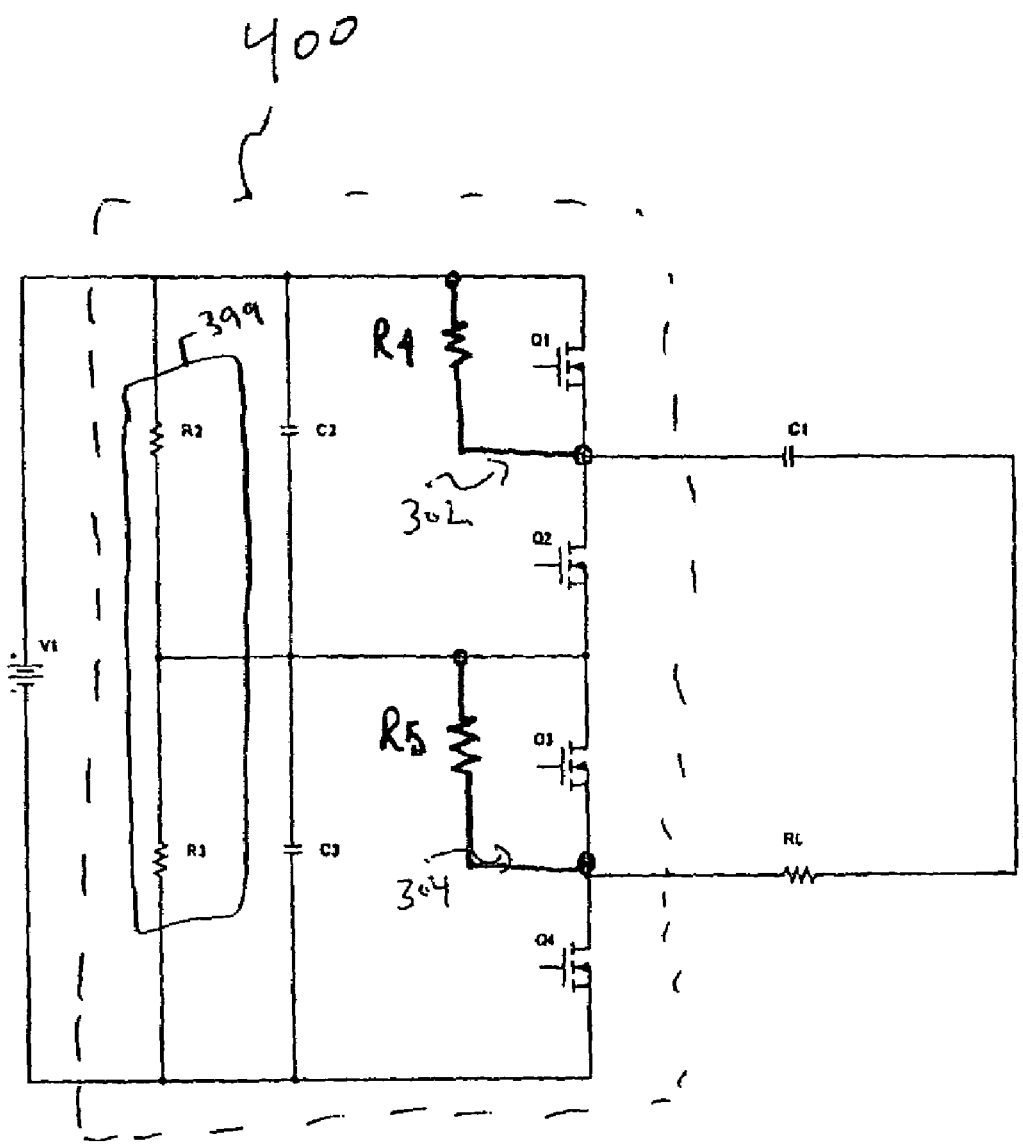
FIG. 4 shows a circuit according to an embodiment of the invention.

Referring now to FIG. 4, FIG. 4 is a schematic of an output circuit 400 according to another embodiment. Circuit 400 is similar to circuit 300, however, circuit 400 includes a resistor R4 connected across Q1 and a resistor R4 connected across R3. Resistors R4 and R5 function to prebias blocking capacitor C1 with ½ the input voltage (V1) when all switches have been off for a period of time.

While various embodiments/variations of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Additionally, while the process described above and illustrated in the drawings is shown as a sequence of steps, this was done solely for the sake of illustration. Accordingly, it is contemplated that some steps may be added, some steps may be omitted, the order of the steps may be re-arranged, and/or some steps may be performed simultaneously.

What is claimed is:

1. In an environment comprising an output circuit for providing an AC voltage, wherein the output circuit comprises a first, second, third and fourth switch, a method of operating the output circuit comprising:

(a) operating the switches so that the first and fourth switch are on and the second and third switch are off for a first period of time;

(b) after said first period of time has expired, operating the switches so that the first and fourth switch are off and the second and third switch are on for a second period of time; and (c) after said second period of time has expired, repeating steps (a) and (b) one or more times, wherein the switches are connected in series such that the second switch is connected directly between the first switch and the third switch and the third switch is connected directly between the second switch and the fourth switch.

2. The method of claim 1, wherein the switches are transistors.

3. The method of claim 2, wherein the transistor are field effect transistors.

4. The method of claim 1, wherein the load is connected in series with a blocking capacitor.

5. The method of claim 4, wherein the load, the blocking capacitor, the second switch, and the third switch form a closed electrical loop.

6. The method of claim 5, wherein the switches are connected in parallel with a DC voltage source such that the sum of (a) the voltage across the first switch, (b) the voltage across the second switch, (c) the voltage across the third switch, and (d) the voltage across the first switch is equal to the DC voltage produced by the DC voltage source.

7. The method of claim 6, wherein the blocking capacitor receives charge from the DC voltage source by the simultaneous operation of the first switch and the fourth switch.

8. A circuit apparatus for providing an AC voltage to a load, comprising:
- a first, second, third and fourth switch, wherein the switches are connected in series such that the second switch is connected directly between the first switch and the third switch and the third switch is connected directly between the second switch and the fourth switch;
- a voltage source, wherein the voltage source is electrically connected directly between the first switch and the fourth switch;
- a resistive divider connected across the voltage source;
- a first resistor connected in parallel with the first switch;
- and a second resistor connected in parallel with the third switch wherein
- the sum of (a) the voltage across the first switch, (b) the voltage across the second switch, (c) the voltage across the third switch, and (d) the voltage across the first switch is equal to the voltage produced by the voltage source.

9. The circuit of claim 8, wherein the resistive divider comprises a third resistor connected in series with a fourth resistor.

10. The circuit of claim 9, further comprising a first filter capacitor connected across the third resistor and a second filter capacitor connected across the fourth resistor.

11. The circuit of claim 10, further comprising a blocking capacitor having a first terminal connected to an output node, wherein the output node is between the first switch and the second switch.

12. The method of claim 11, wherein the load, the blocking capacitor, the second switch, and the third switch form a closed electrical loop.

13. The method of claim 12, wherein the blocking capacitor receives charge from the voltage source by the simultaneous operation of the first switch and the fourth switch.

14. The circuit of claim 8, wherein the switches are transistors.

15. The method of claim 14, wherein the transistor are field effect transistors.

\* \* \* \* \*